United States Patent [19]

Kuehn

[11] Patent Number: 4,555,764
[45] Date of Patent: Nov. 26, 1985

[54] NET ENERGY TRANSFER MEASUREMENT METHODS, APPARATUS AND SYSTEMS WITH SOLAR ENERGY AND CONTROL APPLICATIONS

[75] Inventor: Thomas H. Kuehn, Ames, Iowa

[73] Assignee: Iowa State University Research Foundation, Inc., Ames, Iowa

[21] Appl. No.: 334,513

[22] Filed: Dec. 23, 1981

[51] Int. Cl.[4] ............................................. G01K 7/00
[52] U.S. Cl. ................................. 364/557; 126/419; 374/29; 374/30
[58] Field of Search ....................... 364/418, 505, 557; 126/417, 419, 422; 374/29, 30, 109; 236/91 R, 91 G; 52/171; 160/7

[56] References Cited

U.S. PATENT DOCUMENTS

| | | | |
|---|---|---|---|
| 3,348,047 | 10/1967 | Clifford | 374/30 X |
| 3,903,665 | 9/1975 | Harrison | 52/171 |
| 3,952,947 | 4/1976 | Saunders | 52/171 X |
| 4,217,646 | 8/1980 | Caltagirone et al. | 364/418 X |
| 4,219,008 | 8/1980 | Schultz | 126/419 |
| 4,245,500 | 1/1981 | Malang | 374/30 |

*Primary Examiner*—Gary Chin
*Assistant Examiner*—Edward R. Cosimano
*Attorney, Agent, or Firm*—Senniger, Powers, Leavitt and Roedel

[57] ABSTRACT

Heat flux sensors respectively painted black and white and mounted to a passive solar energy window intercept solar radiation and change the temperature of part of the window. The sensors, and differentially connected thermocouples attached to them, couple data to an electronic computer by which the solar radiation, reradiation, and conduction/convection thermal loss through the undisturbed balance of the window can be deduced. The computer outputs the net energy transfer NET to a recorder, a two-state indicator, and a window insulation control unit. The circuitry of the control unit responds to an ordinary thermostat and the NET from the computer to produce a condition signal, senses the position of the insulation, and repositions the insulation when necessary in response to the condition signal. The insulation is moved to block the window when the direction of NET is into the building and the inside temperature is higher than the thermostat limit temperature, and when the direction of NET is outward and the inside temperature is lower than the thermostat limit temperature.

16 Claims, 14 Drawing Figures

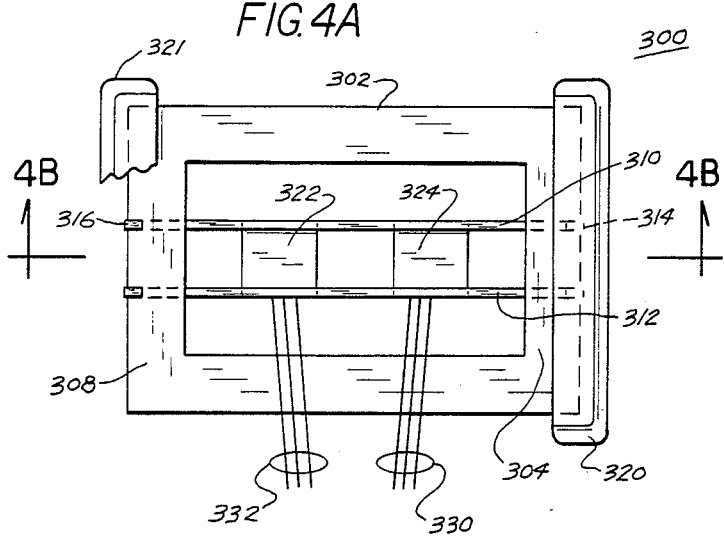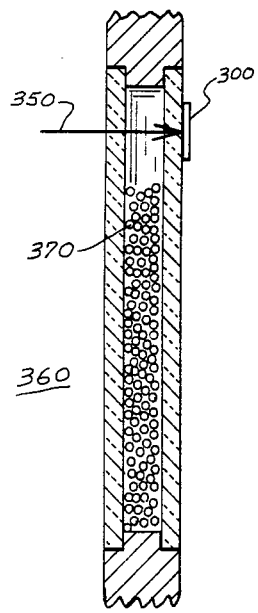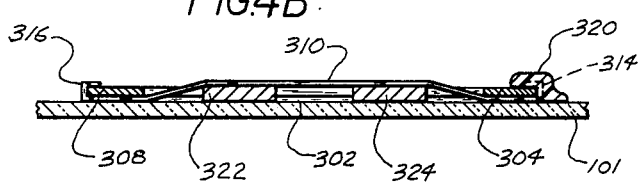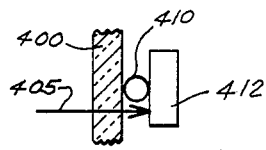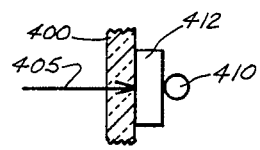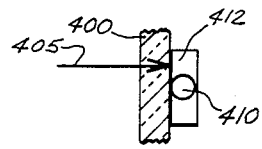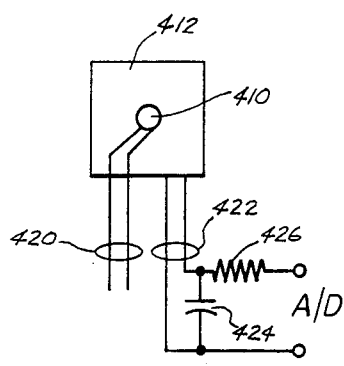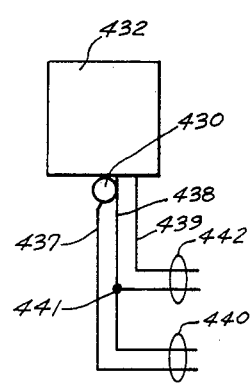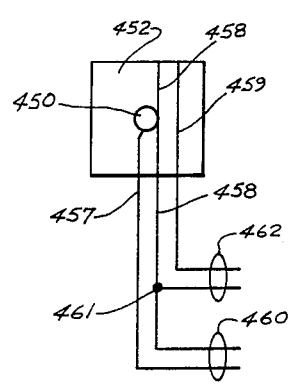

NET ENERGY TRANSFER MEASUREMENT METHODS, APPARATUS AND SYSTEMS WITH SOLAR ENERGY AND CONTROL APPLICATIONS

BACKGROUND OF THE INVENTION

The present invention relates to the field of energy transfer measurement methods, apparatus, and systems. More specifically, the present invention relates to methods, apparatus and systems for measuring, and in some embodiments controlling, net energy transfer by radiation, convection and conduction through a fenestration, such as a window or translucent panel. The invention has applications in a variety of industrial and consumer fields, and it is emphasized that the background of the invention is discussed herein by way of comparison with merely one specific field of application, that of passive solar energy.

In the prior art, various systems have been proposed for operating solar heated buildings. For instance, it is known to use movable insulation to reduce heat loss through glazed openings such as windows, skylights, clerestories, and Trombe walls in a well-insulated building. Such movable insulation can be of hand operated variety, thermally sensitive type, or motor-driven type. Motor-driven applications are either manually activated or controlled by automatic timers, thermostats or light sensitive devices--examples are foam beads blown between double glazing, and motor-driven sliding insulation, blinds, or panels. Such systems feature relatively crude control of the insulation relative to the energy considerations which must be accounted for, thus wasting solar energy and consequently building heat.

In the passive solar heating of buildings, the solar energy should be turned on only when it is needed, so as to avoid overheating; and the solar energy should be turned off only when it is not needed, so as to avoid overcooling. Unfortunately, determining the threshold decision points is not a simple problem in the solar energy field. If the solar energy is to be controlled by movable insulation, it must be recognized that the highly time-variable solar radiation entering the building is accompanied by complex heat convection and conduction processes between building and environment, as well as reradiation. Unlike a furnace or electric heater which when energized always provides net heat energy flow from itself into the interior of the building, the control of the sun by means of movable insulation introduces variable radiation, convection, and conduction processes which often work at cross-purposes to each other. It is as if there is a "furnace" which can cool a building when it should be heating, and which can heat the building when it should be cooling, unless some means of accurate control can be found.

Accordingly, the accurate control of the timing of the use of solar energy in passively heated buildings is a significant problem, which a mere timer, wall thermostat, or light-sensitive cell is insufficient to solve. The reason is that accurate control depends on continuing knowledge of a quantity denominated herein as "net energy transfer (NET)". Net energy transfer is the actual solar energy available to pass into the building through a fenestration when the movable insulation is retracted or unblocked, net of losses by reradiation, convection, and conduction. Since an important advantage of passive solar energy is low cost, it is essential that the additional cost of such accurate measurement and control be kept small. Accordingly, the economical and convenient measurement of net energy transfer NET is an objective of the present invention.

Although it has just been stated that the ordinary wall thermostat is insufficient to provide the necessary accurate control of the solar energy, the consumer of energy usually finds it convenient and advantageously familiar to be able to control the building temperature by means of such a thermostat. Accordingly, it is a further objective of the present invention not only to accurately measure the net energy transfer NET through solar energy windows but also to control the solar energy with comparable convenience to the thermostatic manner in which natural gas, heating oil, and electric heating sources of energy in buildings are controlled in the prior art.

An additional problem in the solar energy field is accomplishing optimal control of more than one solar energy window in a passive solar building. In such a situation, it is not readily apparent whether all such windows should be blocked or unblocked at the same time, and if so when; or whether some windows should be blocked and others unblocked, and if so, which ones and when. Accordingly, it is a still further objective of the invention to provide accurate control for each additional solar energy window at relatively insignificant additional expense.

Other objectives and advantages of the present invention will be evident from the description of the invention hereinbelow.

SUMMARY OF THE INVENTION

In the present invention it has been discovered that intercepting the solar energy itself and using the intercepted solar energy to change the temperature of part of the fenestration makes it possible to deduce not only the amount of incoming solar radiation, and the reradiation, but also the amount of heat flux being transferred by thermal processes through the rest of the fenestration which is undisturbed. These amounts are precisely those needed to determine net energy transfer NET. Measurement devices, known as transducers, mounted in thermal contact with the fenestration not only gather thermal data but also are themselves used as the means of intercepting the solar energy and changing the temperature of the part of the fenestration with which they come into thermal contact. An automatic computing device such as an inexpensive microprocessor receives data from the transducers, reduces it to NET and outputs the NET to a display device, recording equipment, or real-time window insulation control apparatus.

The practice of the invention is compatible with use of thermopile heat flux sensors, and inexpensive thermocouples differentially connected for generating electrical analogs of temperature differences. In this way, the use of expensive pyranometer equipment for measuring radiation is avoided, and the cost of temperature reference units and electronic thermometers is eliminated where these are not desired.

The inventive instrumentation is suitably used for energy audits of windows in residential and commercial structures, and for continuous, accurate measurements of window structure thermal properties in research applications. In an additional advantageous feature, the instrumentation need not be modified to permit measurements of energy transfer through opaque walls.

In window insulation control applications, at least one window is provided with equipment for moving insulation so as to controllably block and unblock the window. A convenient thermostat device is provided which permits the user to designate a nominal or limit temperature (or upper and lower limits of a desired temperature zone) near which the inside temperature of the building is to be maintained, and the thermostat determines or registers whether the inside temperature is higher or lower than the nominal temperature.

The invention provides computation and control apparatus which receives information from the transducers and thethermostat and computes the net energy flow or transfer NET and provides window insulation control so that blocking occurs when the direction of net energy flow is inward and the inside temperature is higher than the limit temperature and when the direction of net energy flow NET is outward and the inside temperature is lower than the limit temperature. In this way the convenience of thermostatic control is incorporated in passive solar energy window insulation control by putting NET information into the system.

The computation and control functions in window insulation control applications are suitably provided in a computer or microprocessor to which the transducers and thermostat are coupled, or provided by a NET computer and a separate controller unit to which the thermostat, NET computer, and motorized window blocking equipment are connected. The invention is comprehensive of such alternatives.

In those cases in which a separate controller unit is used, a further feature of the invention involves arranging the controller to include three sets of apparatus: (A) circuit for producing a condition signal in response to the thermostat and the NET from the computer, (B) circuit for sensing position of the insulation and driving the blocking equipment in response to the condition signal, and (C) circuit for sensing position of the insulation and driving the blocking equipment to unblock the window in response to the logical complement of the condition signal.

Optimal control of more than one solar energy window in a passive solar energy building is readily accomplished by the invention with relatively insignificant additional expense. When the additional windows are oriented and illuminated with sunlight in the same manner as the first window having instrumentation, no additional transducers are needed as the NET cutover points are the same for the additional windows. Movable insulation equipment is provided for the additional windows and controlled in tandem with that for the first window by the same computation and control apparatus.

When the additional windows are illuminated differently, window transducers are merely added for each differently illuminated window and coupled to the same computer. The computer calculates NET for each such window individually, and the movable insulation equipment for the additional windows is controlled individually according to the respective NET measurements.

The present invention is applicable in a variety of environments in which energy is being transferred by radiative and thermal processes between adjacent regions and there is a need for accurate measurement, or measurement and control, of the energy transfer. For example, applications in which the fenestration divides water from air, divides water from water, divides organic liquid from gaseous medium, and gas from gas are contemplated. Such applications include underwater and undersea equipment, and assemblies for a variety of land-based industrial large-scale processes. Moreover, the invention is applicable in respect of any electromagnetic or particle radiation which can be intercepted and used to thermally disturb the fenestration for its measurement purposes.

BRIEF DESCRIPTION OF THE DRAWING

FIG. 4A is a front view of a sensor assembly unit for window mounting in the systems of FIGS. 1 and 2.

FIG. 4B is a cross-section of the sensor assembly unit of FIG. 4A.

FIG. 5 is a cross-sectional simplified view of the installation of a sensor assembly unit of FIG. 4A on a window having movable insulation of the blowable bead type.

FIGS. 6A, 6B, and 6C are depictions of alternative arrangements of heat flux sensors and thermocouples for use in the invention.

FIGS. 7A, 7B, and 7C are alternative wiring diagrams of heat flux sensors and thermocouples for use in the invention.

DETAILED DESCRIPTION OF THE DRAWING

Figure 1:
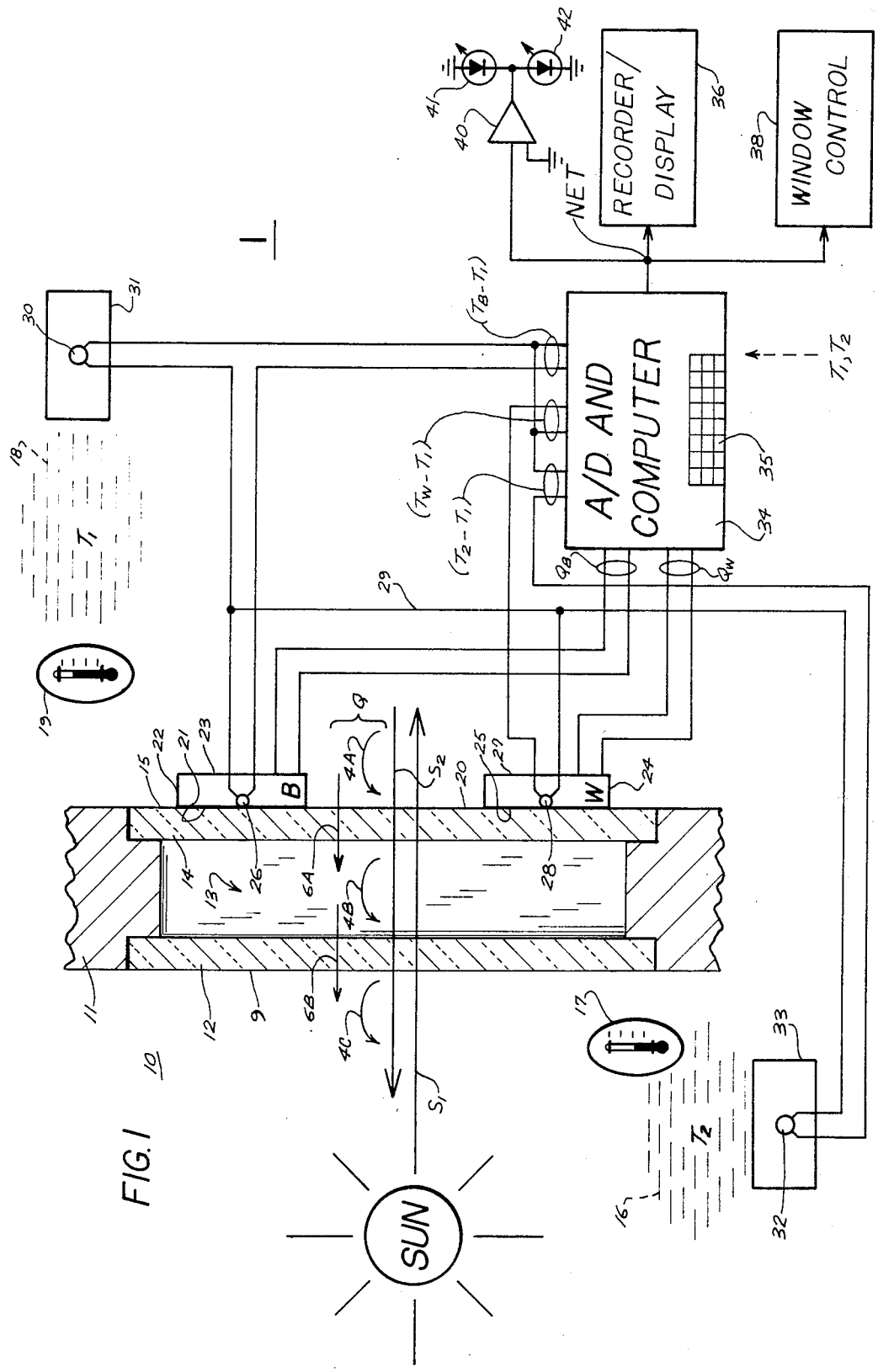
FIG. 1 is a partially cross-sectional, partially block diagram of a net energy transfer NET measuring system of the invention showing transducers drawn in relation to a solar energy window.

In FIG. 1 the sun provides incident shortwave solar radiation energy $S_1$ to double glazing 10. Double glazing 10 includes glass panes 12 and 14 separated by airspace 13 by means of frame 11. Shortwave reradiation $S_2$ from the opposite direction is a radiative energy loss component. Thermal loss Q occurs by longwave radiation and convection processes 4A, 4B and 4C and conduction 6A and 6B. The loss Q becomes negative, or becomes not a loss but a gain, when the convection, longwave radiation, and conduction cause heat to flow in the same direction as the incident solar radiation $S_1$. The net energy transfer NET is regarded as the incident solar radiation $S_1$ less the reradiation $S_2$ less the thermal loss Q. The ambient temperature $T_2$ outside double glazing 10, in region 16, is suggested by thermometer 17 of ordinary mercury type, and the ambient temperature $T_1$ inside glazing 10, in region 18, is suggested by similar thermometer 19.

Inventive NET measurement system 1 includes radiation absorbing black-painted heat flux sensor 22 and white-painted heat flux sensor 24, thermocouples 26, 28, 30, and 32 and computer 34 having analog-to-digital converting (A/D) inputs and keyboard 35. Computer 34 outputs NET to chart recorder 36, window insulation control device 38, and two-state indicator having amplifier 40 and oppositely-connected light-emitting diodes (LEDs) 41 and 42.

The outside surface of pane 12 and the inside surface 15 of pane 14 separate regions 16 and 18 respectively.

Black heat flux sensor 22 is mounted in thermal contact with inside surface 15 of pane 14, as is white heat flux sensor 24. Sensors 22 and 24 cover the part of inside surface 15 of pane 14 corresponding to sensor forward surfaces 21 and 25, leaving the balance 20 of inside surface 15 of pane 14 uncovered. Both forward surface 21 and back surface 23 of sensor 22 are painted black to intercept radiation $S_1$ and reradiation $S_2$ with equal absorptivity $a_b$ respectively. Similar provision is made for painting the front surface 25 and back surface 27 of sensor 24 with white flat paint for equal absorptivity $a_w$ to the radiation $S_1$ and reradiation $S_2$.

Thermocouple temperature measuring elements are respectively provided in thermal contact with each heat flux sensor by physically placing thermocouple elements 26 and 28 between heat flux sensors 22 and 24 and inside surface 15. In this way thermocouples 26 and 28 are in both physical contact and thermal contact with their respective heat flux sensors 22 and 24 and pane 14.

Inside ambient temperature thermocouple 30 is exposed to temperature $T_1$ in region 18, and outside temperature thermocouple 32 is exposed to temperature $T_2$ in region 16. Each ambient temperature thermocouple 30 and 32 is provided with radiation shield 31 and 33 respectively for more accurate measurement.

Heat flux sensors 22 and 24 are relatively inexpensive commercially available thermopile elements having copper lead pairs respectively providing electrical analog voltages corresponding to heat fluxes $Q_b$ and $Q_w$ passing through the sensors normal to their broadside surfaces 23 and 27. Heat fluxes $Q_b$ and $Q_w$ are thermal quantities which are affected by interception of radiated solar energy $S_1$ and reradiation $S_2$ by the heat flux sensors 22 and 24. As such, heat fluxes $Q_b$ and $Q_w$ depart substantially from the undisturbed window thermal loss heat flux Q in the presence of substantial radiation $S_1$ and $S_2$. Moreover, the different absorptivities $a_b$ and $a_w$ of the black and white painted sensors 22 and 24 intercept radiation so as to cause measurably different heat fluxes $Q_b$ and $Q_w$ to be sensed by the sensors 22 and 24 and to cause measurably different temperatures $T_b$ and $T_w$ to be presented to thermocouples 26 and 28 respectively. Heat flux sensors 22 and 24 are suitably spaced apart so that their warming effect on pane 14 in the presence of radiation does not significantly affect the measurements of each sensor in the presence of the other sensor, i.e. sensors 22 and 24 are suitably in thermal isolation from each other.

All four thermocouples 26,28,30, and 32 are suitably copper-constantan junctions of inexpensive commercially available type. The constantan lead from each thermocouple 26,28,30, and 32 is brought into common connection 29. The copper lead from each thermocouple 26,28,30, and 32 is brought to the A/D converter inputs on computer 34 for analog-to-digitally converting the temperature-difference data presented thereby. It will be noted that the four copper leads from the thermocouples 26,28, 30, and 32 can be organized into six possible pairs (the number of combinations of 4 taken 2 at a time $= 4\cdot 3\cdot 2\cdot 1/(2\cdot 1)\,(2\cdot 1) = 6$) representing the temperature differences $(T_2 - T_1), (T_w - T_1), (T_b - T_1), (T_w - T_b), (T_b - T_2), (T_2 - T_w)$. Further, if any three of the six differences, being such that all four subscripts 2,1,b, and w appear in the algebraic representation of such three, be selected, then the rest of the differences can be derived in the computer 34 by appropriate additions or subtractions. Accordingly, the four copper leads from the thermocouples 26,28,30, and 32 are brought advantageously to only three A/D converter inputs on computer 34, and the three differences $(T_2 - T_1), (T_w - T_1), (T_b - T_1)$ are somewhat arbitrarily selected and shown in FIG. 1. These differences are provided by connecting the copper lead from thermocouple 30 to all three A/D converter inputs, and the copper leads respectively from thermocouples 26,28, and 32 to each of the A/D inputs as shown.

In an advantageous feature of the invention, it has been discovered that the computer 34 can be programmed with an algorithm for calculating net energy transfer NET, as well as the radiation $S_1$ and reradiation $S_2$ and the amount Q of convection, longwave radiation and conduction through part 20 of window surface 15, which utilizes only $Q_b$, $Q_w$, and differences in measured temperature. Because as to temperature, only difference data is needed, no temperature reference units are needed for the thermocouples at a considerable saving in expense, and connection of the thermocouples at common 29 suffices. Connection of the devices at a common is termed "differentially connected" herein in order to identify such manner of connection that analog differences are generated for presentation and coupling to the computing apparatus.

The measurement system of FIG. 1 is readily capable of calculating NET repeatedly for indefinite periods of time and recording the physical representation of NET generated by computer 34 on recorder 36. When NET is an analog voltage generated by the computer 34, amplifier 40 causes LED 42 to light when NET exceeds zero level and causes only LED 41 to light when NET is less than zero (net heat loss through glazing 10). Amplifier 40 can, of course, be biased to change the LED indication at any predetermined level of NET. Such bias is advantageously applied, for instance, when a signal for opening insulation manually is desired whenever NET is positive or when NET is negative but loss is not in excess of a predetermined magnitude. When NET is a digital signal, amplifier 40 is connected so as to respond to the sign bit of the NET signal.

When it is not inconvenient to enter quantities through keyboard 35, the thermocouple 32 is readily dispensed with, and the quantities $T_1$ and $T_2$ are simply read from thermometers 17 and 19 and entered into the computer 34 memory via keyboard 35. The temperature difference between the first and second regions 16 and 18 whether obtained from thermocouples, reading of thermometers 17 and 19, or from electrical thermometers of other types, is stored in the computer and updated continuously (as in FIG. 1) or occasionally as the skilled worker may elect.

Figure 2:
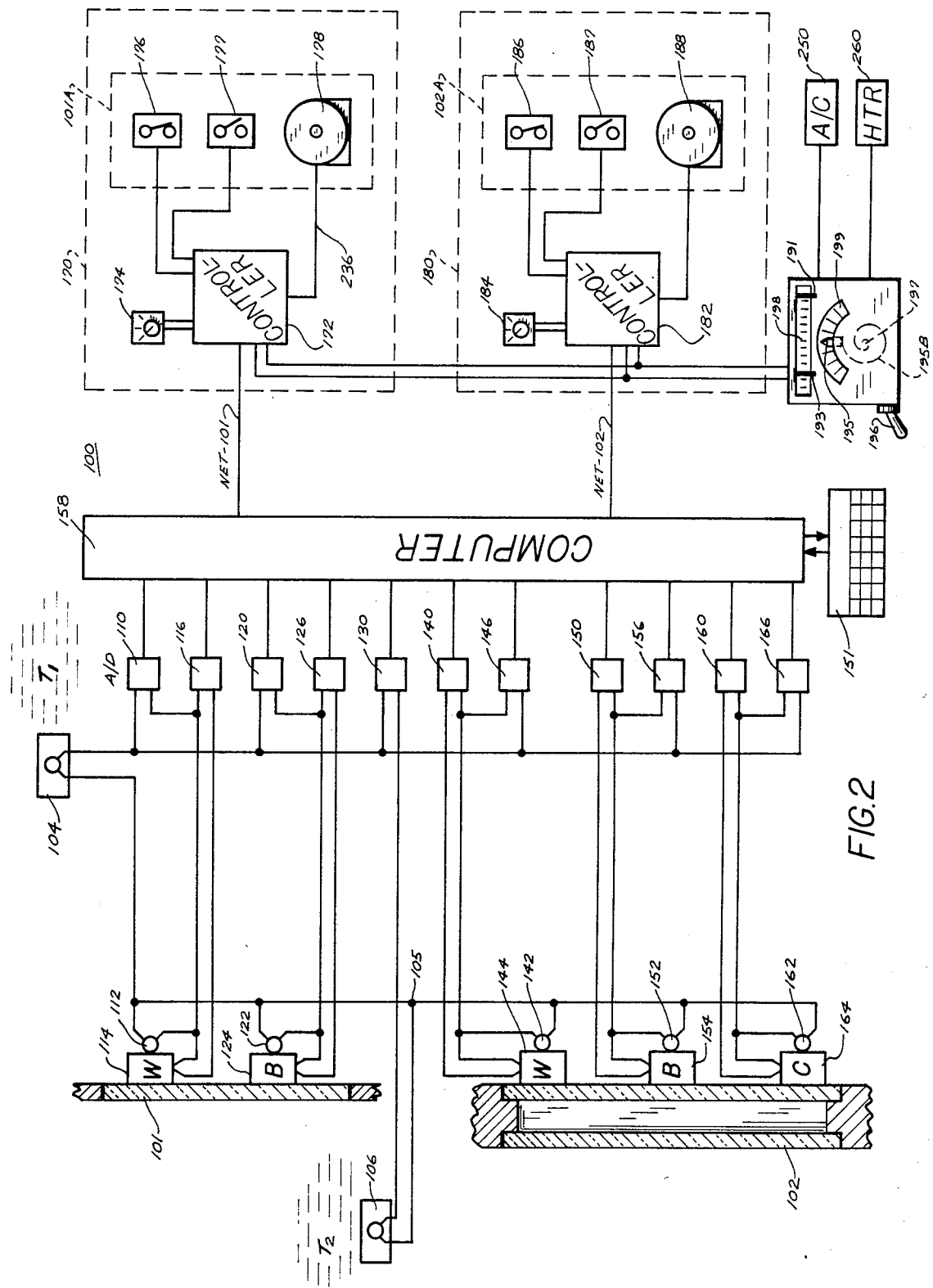
FIG. 2 is an electrical block diagram of another NET measuring system of the invention for two windows, and showing separate control of movable insulation for each window.

FIG. 2 illustrates multiple-window instrumentation according to the invention, by means of window measurement and control system 100. Thermocouples 104 and 106 are exposed to and in thermal equilibrium with the inside and outside regions having ambient temperatures $T_1$ and $T_2$ respectively. Single-glazed window 101 is instrumented with a white and black pair of heat flux sensor-thermocouple combinations 114,112 and 124,122. The constantan leads of thermocouples 104,112,122, and 106 are connected to common 105. Heat flux sensors 114 and 124 are coupled to the computer via analog-to-digital converters 116 and 126 which receive copper lead wires from the heat flux sensors 114 and 124. In a feature of the invention which keeps the amount of lead wire from the instrumentation low, the copper lead wire from thermocouple 112 is connected directly to one of the copper wires of white heat flux sensor 114 and the copper lead from thermocouple 122 is connected directly to one of the copper wires of black heat flux sensor 124. In this way the temperature differencing thermocouples 104,112,122 are coupled to A/D converters 110 and 120 in part by some of the lead wires from the heat flux sensors 114 and 124. The number of cable conductors from windows to computer can thus be kept essentially equal to the number of transducers in the system, instead of twice their number as might be presumed.

For window 101, A/D converter 110 receives $(T_w-T_1)$, converter 116 receives $Q_w$, converter 120 receives $(T_b-T_1)$, converter 126 receives $Q_b$, and converter 130 receives $(T_2-T_1)$.

Computer 158 is provided with keyboard-CRT terminal 151 and receives digital inputs from A/D converter input cards 110,116,120,126,130,140,146,150,156,160 and 166. Computations according to an algorithm for NET, an example of which is described hereinbelow, are performed and the NET for window 101 is output on line NET-101 from the computer 158, to a window insulation control apparatus 170 for window 101.

Window 102 is of double-glazed type like window 10 of FIG. 1. It is suitably instrumented by white heat flux sensor 144, thermocouple 142 and by black heat flux sensor 154 and thermocouple 152. In other words, a plurality of thermocouples and heat flux sensors coresponding to each window or fenestration is provided in addition to thermocouple 104. For window 102, A/D converter 140 receives $Q_w$, converter 146 receives $(T_w-T_1)$, converter 156 receives $(T_b-T_1)$ and converter 150 receives $Q_b$. Since $(T_2-T_1)$ is already available from thermocouples 106, 104 and A/D converter 130, it is unnecessary to duplicate these components for window 102.

In an additional feature of the invention, part of window 102 is also changed in temperature when warmed by a heat flux sensor 164-thermocouple 162 pair having absorptivity intermediate between black and white. Flat grey or flat colored paint is suitably used for sensor 164. Sensor 164 is exposed to a heat flux $Q_c$ and thermocouple 162 is exposed to a temperature $T_c$. The data are conveyed to A/D converter 160 for $Q_c$ and converter 166 for $(T_c-T_1)$. The pair 162,164 make possible an advantageous redundancy in that a malfunction in any one sensor 144,142,154, 152,164,162 can be readily detected and avoided by using the others. Also, all the pairs 144,142; 154,152; and 164,162 are suitably used for redundant calculations of NET and thereby averaging out measurement errors or manufacturing variations in the instrumentation characteristics. The NET for window 102 is calculated by computer 158 and output on line NET-102, for use by window 102 insulation control assembly 180.

Window control assembly 170 includes reversible motor 178 for moving window-blocking insulation (not shown) between a blocking position and an unblocked position relative to window 101. Sensing switch 176 detects when the insulation is fully blocking the window 101, and sensing switch 177 detects when the insulation has been moved to the fully unblocked position. The assembly of motor 178 and sensing switches 176 and 177 is mounted with the window-blocking insulation on or near window 101 as assembly 101A. An insulation position switch 174 has three alternative positions for either automatic insulation operation, or overriding the automatic features of system 100 to block the window 101 at all times (manual close), or overriding the automatic features of system 100 to unblock the window 101 at all times (manual open). Controller apparatus 172 receives information from position switch 174, sensing switches 176 and 177, thermostat 190, and the NET for window 101. Then controller apparatus 172 operates motor 178 along cable 236 in the appropriate manner that will be more fully described.

Window control assembly 180 is identical in construction to window control assembly 170 and includes sensing switches 186 and 187 corresponding to sensing switches 176 and 177 respectively, and reversible motor 188 corresponding to motor 178. Sensing switches 186 and 187 and motor 188 are mounted on or near window 102 as assembly 102A for moving additional window-blocking insulation (not shown) relative to window 102. Controller apparatus 182 and its insulation position switch 184 are identical to controller apparatus 172 and its insulation position switch 174 respectively. Controller apparatus 182 is fed by thermostat 190 in the same manner as controller apparatus 172, but controller apparatus 182 receives the distinct NET representation for window 102 on line NET-102. Accordingly, controller 182 operates independently of controller 172 and controls window 102 separately in an optimal manner specific to window 102. Because window insulation control assemblies 170 and 180 are identical in construction, no additional description of assembly 180 is undertaken.

Thermostat 190 is next described with reference to FIG. 2 for exterior description and with reference to its diagram in the lower portion of FIG. 3 for interior and electrical detail.

Thermostat 190 includes thermometer pointer 195 indicating inside temperature $T_1$ on scale 199. Pointer 195 is driven by bimetal spiral element 195B which in turn is fixedly mounted as a self-contained thermometer on thermostat cover plate 197.

Temperature-limit-designating tab arms 191 and 193 are disposed over temperature scale 198 and respectively set the high temperature limit $(T_H)$ and the low temperature limit $(T_L)$, as of a comfort zone of temperature in a building. Winter-summer toggle switch 196 is set for the seasonal conditions. Thermostat 190 is connected to backup air conditioning (A/C) 250 and backup heater (HTR) equipment 260 in addition to the passive solar window control assemblies 170 and 180.

Figure 3:
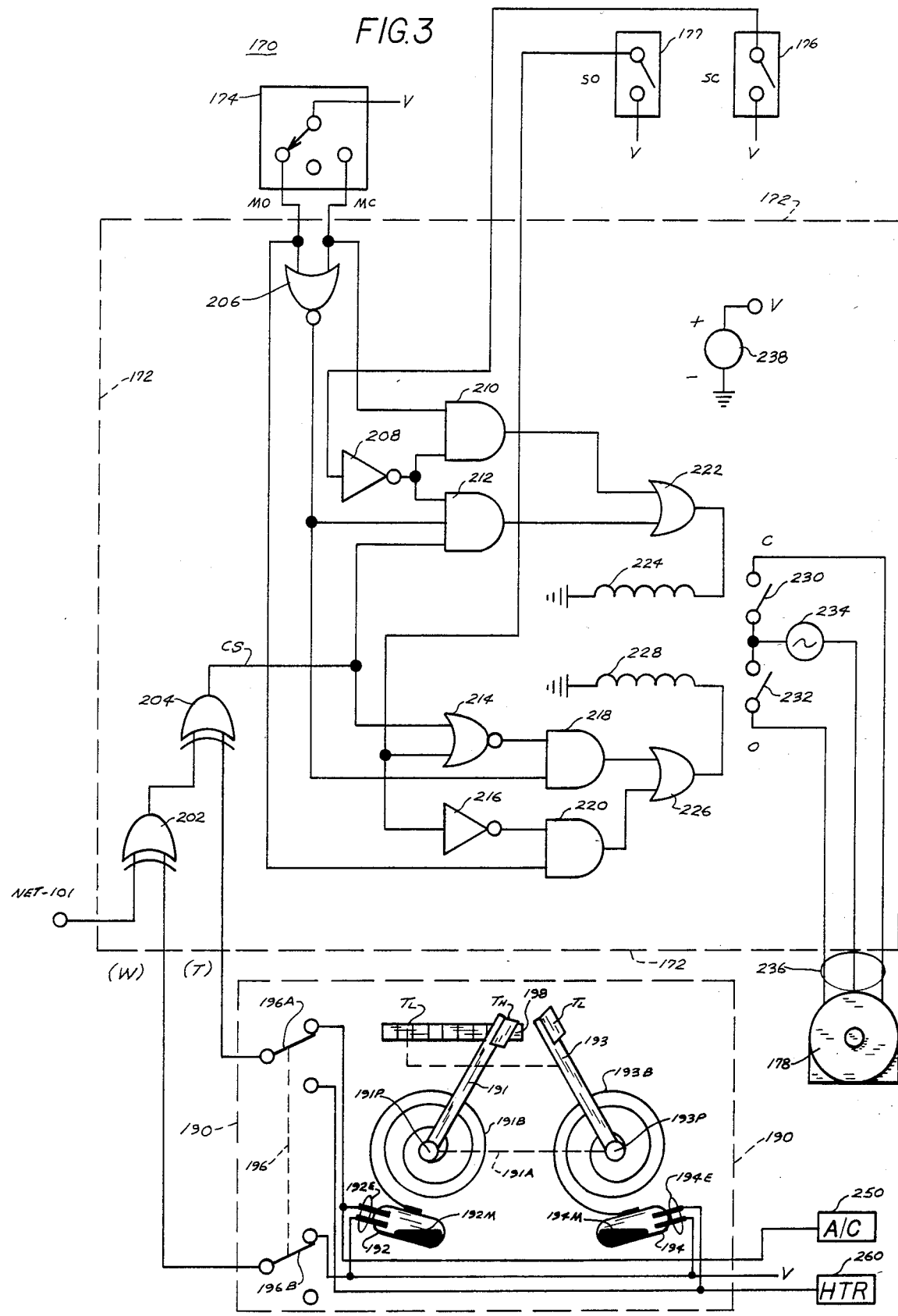
FIG. 3 is a more detailed electrical block diagram of one of the window control units of FIG. 2 with thermostat circuitry.

In the interior of thermostat 190, shown diagrammatically in the lower portion of FIG. 3, bimetal spirals 191B and 193B are respectively affixed centrally to tab arms 191 and 193. Occasional adjustment of the angular positions of the bimetal spirals 191B and 193B is made around stiff pivots 191P and 193P by finger adjustment of tab arms 191 and 193. Bimetal spirals 191B and 193B are coaxially mounted on axis 191A so that tab arms 191 and 193 are adjustable with reference to the single temperature scale 198 provided for them. (Bimetal spirals 191B and 193B are shown displaced from each other and in the plane of the paper on FIG. 3 to facilitate disclosure, but it is to be noted that the spirals 191B and 193B are coaxial and adjacent so that axis 191A is perpendicular to the paper in the actual thermostat assembly being represented.) Two illustrative positions $T_L$ and $T_H$ on scale 198 for tab arms 193 and 191 are shown in FIG. 3 corresponding to their positions in FIG. 2.

Mercury switches 192 and 194 are respectively attached tangentially on the outer circumference of spiral 191B and 193B respectively. Mercury switch 192 is mounted and arranged together with spiral 191B so that mercury switch 192 is electrically open when the ambient temperature $T_1$ is less than high temperature limit $T_H$ and electrically closed when the ambient temperature $T_1$ is above the high temperature limit $T_H$. Decreasing the $T_H$ setting of tab arm 191 below the ambient temperature $T_1$ moves mercury switch 192 counterclockwise around stiff pivot 191P from the position shown in FIG. 3 and permits mercury bead 192M therein to bridge electrodes 192E. This closes the switch 192, thereby connecting a supply voltage V to backup air conditioning 250 and to the winter pole of section 196A of winter-summer switch 196. Bimetal spiral 191B is coiled in the proper sense so that at any setting $T_H$ of tab arm 191, a rise in the ambient temperature $T_1$ above $T_H$ moves mercury switch 192 counterclockwise from the position shown in FIG. 3 around stiff pivot 191P and also permits the mercury bead 192M therein to close switch 192.

Mercury switch 194 is mounted and arranged together with bimetal spiral 193B so that mercury switch 194 is electrically open when the ambient temperature $T_1$ is greater than low temperature limit $T_L$ and electrically closed when the ambient temperature $T_1$ is below the low temperature limit $T_L$. Increasing the $T_L$ setting of tab arm 193 above the ambient temperature $T_1$ moves mercury switch 194 clockwise around stiff pivot 193P from the position shown in FIG. 3 and permits a mercury bead 194M therein to bridge electrodes 194E. This closes the switch 194 thereby connecting the supply voltage V to backup heater 260 and to the summer pole of section 196A of winter-summer switch 196. Spiral 193B is coiled in the proper sense so that at any setting $T_L$ of tab arm 193, a fall in ambient temperature $T_1$ below $T_L$ moves mercury switch 194 clockwise from the position shown in FIG. 3 around stiff pivot 193P and also permits the mercury bead 194M therein to close switch 194.

In thermostat 190, double-pole-double-throw (DPDT) winter-summer switch 196 has sections 196A and 196B. Section 196A selects a connection to mercury switch 192 or 194, previously described, for transmission of an out-of-zone digital voltage (T) to controller apparatus 172. Section 196B provides a digital voltage (W) indicating the switch 196 setting to controller 172. For instance, the winter setting of section 196B corresponds to voltage-on or Boolean 1. The summer setting of section 196B corresponds to voltage-off or Boolean 0 (not-winter).

The thermostat 190 circuit in FIG. 3 is arranged to make thermostat 190 control passive solar heating and passive window cooling processes, reduce temperature excursions from nominal or from the comfort zone, and maintain inside temperature $T_1$ with a minimal reliance on the backup air conditioning 250 and heating 260.

Winter-summer switch 196 selects the best system operating mode for the weather conditions. If set to winter, the system uses passive solar energy to heat to the high temperature limit $T_H$ if possible, since future cold conditions are anticipated. Since backup heater 260 is not used whenever the inside temperature exceeds the low temperature limit $T_L$, it is apparent that passive solar energy is used to reduce or eliminate energy demand of backup heating 260. If winter-summer switch 196 is set to summer, the system uses passive window cooling to cool to the low temperature limit $T_L$ if possible, since future hot conditions are anticipated. Since backup air conditioning 250 is not used whenever the inside temperature is lower than the high temperature limit $T_H$, passive window cooling is used to reduce or eliminate energy demand by the backup air conditioning 250 as well.

The remainder of FIG. 3 provides details of the controller apparatus 172 in addition to switches 174,176,177 and motor 178 in window insulation control assembly 170, previously discussed in connection with FIG. 2. Controller apparatus 172 takes account of the thermostat 190 digital voltages for winter-summer (W) and out-of-zone (T) and also the net energy transfer NET for its window 101. DC voltage source 238 provides supply voltage V for the logic. It will be noted that the supply voltage lines from voltage source 238 are not shown, for clarity on the drawing, and that the symbol "V" is provided at thermostat 190 and switches 174,176 and 177 to indicate that the supply voltage from source 238 is conducted to each.

Digital voltage SC from sensing switch 176 is on only when the window-blocking insulation (not shown) for window 101 is in the blocked position. Voltage SO from sensing switch 177 is on only when the window-blocking insulation is in the fully unblocked position. In other words, sensing switch 176 is closed and thereby connects voltage V from source 238 as a voltage-on Boolean 1 condition of voltage SC for controller apparatus 172 only when the window insulation is in the blocked position. At all other times the voltage SC is zero corresponding to Boolean 0. On the other hand, sensing switch 177 is closed and thereby connects supply voltage V from source 238 as a voltage-on Boolean 1 condition of voltage SO for controller apparatus 172 only when the window insulation is in the fully unblocked position.

Insulation position switch 174 provides a voltage-on Boolean 1 condition for the digital input voltage MC only when switch 174 is set to the manual close position, thereby connecting supply voltage V from source 238 to the line designated MC on FIG. 3. Switch 174 provides a voltage-on Boolean 1 condition for the digital input voltage MO to controller apparatus 172 only when switch 174 is set to the manual open position, thereby connecting supply voltage V from source 238 to the line designated MO on FIG. 3. When switch 174 is set to the center position for automatic operation of the window insulation, no voltage is provided for MO and MC, so that these are both Boolean 0. NOR-gate 206 in the controller apparatus 172 provides a Boolean 1 at its output when both MO and MC are zero, corresponding to this automatic-operation center position of switch 174.

In controller apparatus 172, a first output CLOSE INSULATION (C) is provided by relay 224 contacts 230 when controller 172 connects AC power source 234 along cable 236 to motor 178 to cause the motor to block the window. A second output OPEN INSULATION (O) is provided by relay 228 contacts 232 when controller 172 connects AC power source 234 in reversing manner along cable 236 to motor 178 to cause the motor to run in reverse and unblock the window 101. In its totality, controller 172 implements the Boolean logic equations:

CLOSE INSULATION (C)={[NOT WINTER AND NET ENERGY TRANSFER IN AND NOT COLDER THAN $T_L$) OR (NOT WINTER AND NET ENERGY TRANSFER NOT IN AND COLDER THAN $T_L$) OR (WINTER AND NET ENERGY TRANSFER NOT IN AND NOT HOTTER THAN $T_H$) OR (WINTER AND NET EN-

ERGY TRANSFER IN AND HOTTER THAN $T_H$)] AND [WINDOW NOT BLOCKED AND NOT MANUAL OPEN AND NOT MANUAL CLOSE ]} OR {MANUAL CLOSE AND WINDOW NOT BLOCKED}.

OPEN INSULATION (O)={[NOT WINTER AND NET ENERGY TRANSFER IN AND COLDER THAN $T_L$) OR (NOT WINTER AND NET ENERGY TRANSFER NOT IN AND NOT COLDER THAN $T_L$) OR (WINTER AND NET ENERGY TRANSFER NOT IN AND HOTTER THAN $T_H$) OR (WINTER AND NET ENERGY TRANSFER IN AND NOT HOTTER THAN $T_H$)] AND [WINDOW NOT UNBLOCKED AND NOT MANUAL OPEN AND NOT MANUAL CLOSE]} OR {MANUAL OPEN AND WINDOW NOT UNBLOCKED}.

Inspection of the above Boolean equations indicates that the logic of the controller 172 regards $T_H$ and $T_L$ as examples of a selectable nominal temperature to be responded to in the same way once the choice of one or the other is made by the winter-summer switch 196. From a hardware standpoint, controller 172 has a hardware section for producing a condition signal CS in response to the thermostat 190 outputs W and T and in response to the net energy transfer NET on line NET-101 so that the condition signal changes corresponding to each change in a logic quantity defined as:

[(NET ENERGY TRANSFER IN AND SAID INSIDE TEMPERATURE HIGHER THAN SAID NOMINAL TEMPERATURE) OR (SAID NET ENERGY TRANSFER NOT IN AND INSIDE TEMPERATURE NOT HIGHER THAN SAID NOMINAL TEMPERATURE)].

In controller 172 the condition signal is produced at the output of exclusive-OR gate 204 having two inputs respectively receiving the thermostat 190 output T signalling when the inside temperature in the building is higher than and not higher than the nominal temperature selected by the winter-summer switch 196 and receiving the output of exclusive-OR gate 202. Exclusive-OR gate 202 has two inputs respectively receiving the physical representation of NET (Boolean 1 if NET is positive or "in", and Boolean 0 if NET is negative or "not in") and receiving the winter-summer signal W. (Excl.-OR of A,B is $A \cdot \overline{B} + \overline{A} \cdot B$.)

In the automatic mode, or center position, on switch 174 ($\overline{MO} \cdot \overline{MC}$) the hardware of controller 172 provides two sections for providing the INSULATION CLOSE (C) and OPEN INSULATION (O) outputs respectively. The first section includes SC switch 176, inverter 208, AND-gate 210, three-input AND-gate 212, OR-gate 222 and relay 224. The first section senses the position of the insulation and provides the first output C for driving the motorized insulation 178 to block the window, the first output C corresponding to the condition signal CS except when the insulation is already in the blocking position.

The second section includes SO switch 177, inverter 216, NOR-gate 214, AND-gates 218 and 220 and OR-gate 226 and relay 228. The second section senses the position of the insulation and provides the second output O for driving the motorized insulation 178 to unblock the window, the second output O corresponding to the logical complement (NOT) of the condition signal CS except when the insulation is already in the unblocked position.

Taking all positions of mode switch 174 into account, together with its NOR-gate 206, the first hardware section producing the CLOSE INSULATION output C is a digital logic circuit for driving relay 224 according to a logic function $MC \cdot \overline{SC} + \overline{MO} \cdot \overline{MC} \cdot \overline{SC} \cdot CS$. The second hardware section for producing the OPEN INSULATION output O is correspondingly a digital logic circuit for driving relay 228 according to a logic function $MO \cdot e,ovs/SO/ + \overline{MO} \cdot e,ovs/MC/ \cdot e,ovs/SO/ \cdot e,ovs/CS/$.

It will be apparent that a variety of design approaches can implement the same Boolean expressions and logic functions and that FIG. 3 is merely illustrative of a preferred embodiment for the practice of the invention.

FIG. 3 furthermore illustrates an approach in which the controller 172 is outboard of the computer 158 of FIG. 2 or the computer 34 of FIG. 1. It is contemplated that the logic of the controller 172 is suitably implemented in software as desired by the skilled worker for execution in a computer when necessary. Switches 174,176, and 177 with thermostat 190 are in such alternative connected along with the transducers to A/D converters at the input to the computer. Window control output lines (not shown) are added to the computer 158 and drive relays 224 and 228 to the motor 178, and all logic gates of FIG. 3 are dispensed with. In such approach the computer absorbs most of the functions in the computation and control apparatus needed to run the window insulation.

FIGS. 4A and 4B respectively show front and cross-sectional views of a sensor assembly unit 300 for conveniently bringing heat flux sensor and thermocouple combinations 322 and 324 into thermal contact with a window together and springably holding them there. "O" shaped rectangular base frame 302 is painted with low absorptivity flat white paint. Flat springs or straps 312 and 310 bridge the space between frame 302 parts 304 and 308 and hold heat flux sensor and thermocouple combinations 322 and 324 from which triple-leads 330 and 332 emanate. The flux sensors are of the rigid plate type rather than thin foil design in this assembly so that durability is enhanced. Flat springs 310 and 312 are anchored at each end as by crimps 314 and 316. The flat springs are selected to be of low thermal conductivity (high thermal resistance) and are painted the same color in each part of their length as the respective color of the sensor over which each part passes. The heat flux sensor and thermocouple combinations 322 and 324 are physically separated for thermal isolation so that space is left around each heat flux sensor and between the heat flux sensors and the base frame 302. (The thermocouples, which are relatively small, are not shown.) Frame 302 is grooved or recessed so that flat springs 310 and 312 pass between frame 302 and glazing 101, and frame 302 rests flat on glazing 101.

Assembly 300 permits simultaneous mounting as a combination each of a plurality of pair of thermocouples in contact with their respective heat flux sensors on the inside surface of window 101. Assembly 300 is temporarily fastened to window 101 by white, or light-colored, commercially available adhesive tape shown as pieces of tape 320 and 321. Permanent mounting is accomplished by glue or cement for causing frame 302 to adhere to window 101.

FIG. 5 depicts an appropriate placement of sensor assembly 300 when blowable insulation beads 370 are provided in window 360. Sensor assembly 300 is placed upward on the inside surface of window 360 just above the highest level assumed by the beads 370. Such placement permits the reception of solar radiation 350 and correct calculation of NET at all times. In this way, the measurement apparatus can calculate when the need for the presence of the insulation 370 to block the window has passed, and the insulation is then removed automatically from glazing 360 by a window insulation control unit, not shown. Similarly, when alternative movable insulation such as motor-driven shutters or a sliding panel is used, the physical arrangement is suitably made to permit sensor reception of solar radiation and correct calculation of NET at all insulation positions.

FIGS. 6A, 6B, and 6C depict alternative physical positions of thermocouple 410 and heat flux sensor 412 relative to the inside surface of window 400. In each case flux sensor 412 is in thermal contact with window 400 so that it both intercepts solar energy 405 and changes the temperature of the window 400. In FIG. 6A thermocouple 410 is in both physical and thermal contact with window 400 and the forward surface of heat flux sensor 412 in the arrangement contemplated by the mathematical model equations presented hereinafter. In FIG. 6B, thermocouple 410 is provided onto the back surface of sensor 412 but remains in thermal contact with window 400 by virtue of the low thermal resistance of the sensor 412 metal. Mathematical model equations are modified to take account of the change in position of the thermocouple relative to the thermal resistance of the heat flux sensor, see positions $T'_b$ and $T'_w$ in FIG. 8. In FIG. 6C thermocouple 410 is provided into a hole drilled into the heat flux sensor 412 so that it is exposed to a temperature in the interior of sensor 412 and is shielded from radiation 405.

FIGS. 7A, 7B, and 7C depict alternative wiring details of the thermocouple and heat flux sensor pairs. In FIG. 7A thermocouple 410 has a separate constantan-copper lead pair 420 from lead pair (copper-copper) 422 from heat flux sensor 412. The input terminals of an A/D converter are shielded from 60 cycle AC hum pickup on lead pairs such as 422 by insertion of an RC hum filter having 22 mfd capacitor 424 and 1000 ohm resistor 426.

In FIG. 7B, the need of four wires in FIG. 7A is obviated as in FIG. 2 by using a common 438 between thermocouple 430 and heat flux sensor 432. Thermocouple 430 is regarded as a junction of a single constantan lead 437 itself to one of the copper leads 438,439 from the heat flux sensor 432. Division at point 441 into wire pairs 440 and 442 for the thermocouple 430 and the heat flux sensor 432 respectively is made as desired.

In FIG. 7C the thermocouple junction is made in the approximate physical center of heat flux sensor 452 for more accurate correspondence between the transducer placement and mathematical model assumptions. Heat flux sensor wires 458 and 459 emanating from the top edge of the heat flux sensor are folded down for presentation of wire 458 to the constantan lead 457 of the thermocouple 450. Division at point 461 into wire pairs 460 and 462 for the thermocouple 450 and heat flux sensor 452 respectively is made as desired.

Mathematical Modelling

Figure 8:
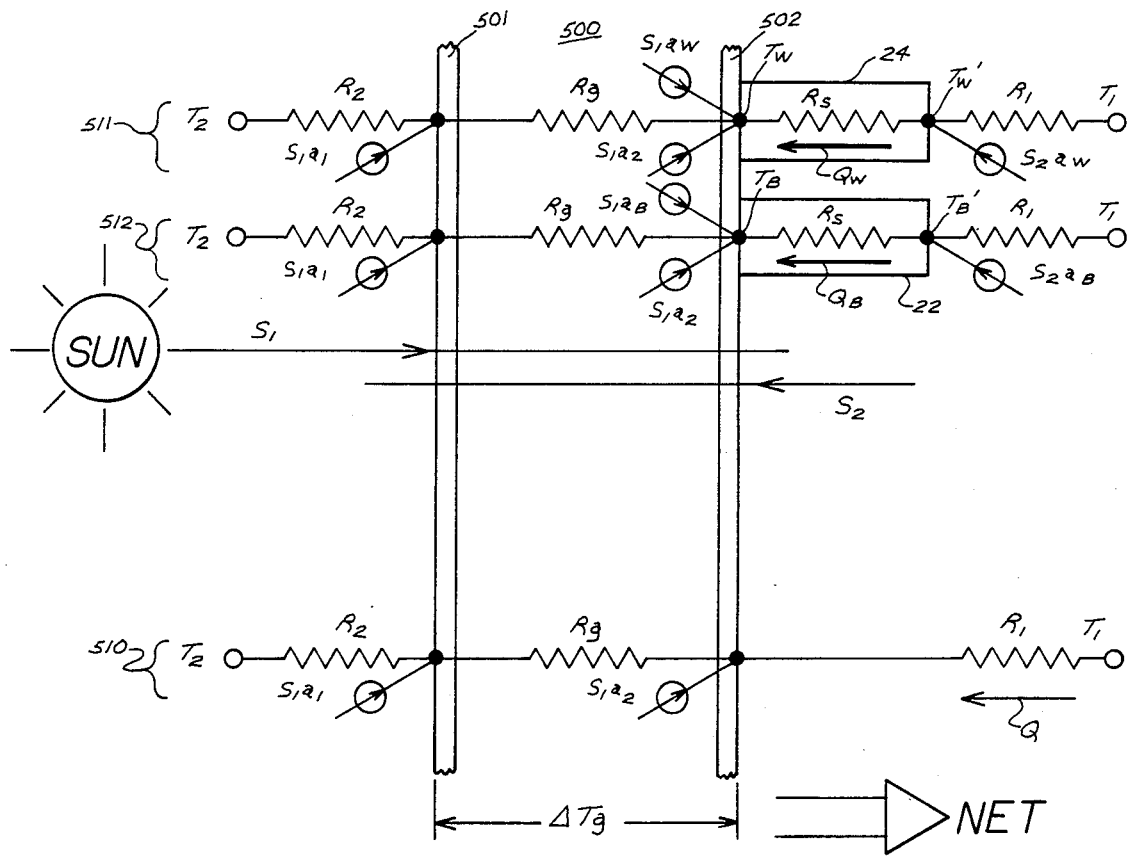
FIG. 8 is a thermal circuit model of a double-glazed window instrumented according to FIG. 1.

FIG. 8 is a thermal circuit diagram of a steady-state radiation-convection-conduction mathematical model of the heat transfer processes occurring in window 500 having exterior glazing 501 and interior glazing 502.

The thermal circuit diagram shows thermal processes in electric circuit form. The ambient temperatures $T_2$ and $T_1$ are modelled as voltage sources, and the flow of heat is modelled as an electrical current passing through thermal resistances $R_1$, $R_g$, and $R_2$ according to a thermal analog of Ohm's Law wherein temperature drop is equal to the product of a thermal resistance times the heat flow, or flux. Solar radiation $S_1$ passing toward region having temperature $T_1$ is absorbed in glazing 501 and is modelled as a current source $S_1a_1$, the product of radiation $S_1$ times glazing 501 absorptivity $a_1$. Similar absorption occurs in glazing 502 as current source $S_1a_2$, and in the white and black heat flux sensors 24 and 22 as current sources $S_1a_w$ and $S_1a_b$ respectively. Reradiation $S_2$ passing toward the region having temperature $T_2$ is absorbed in the white and black sensors as current sources $S_2a_w$ and $S_2a_b$ respectively. Each heat flux sensor presents a thermal resistance $R_s$ which is assumed the same in each sensor. In the presently-described one-dimensional modelling, the heat flux has dimensions of watts per square meter, the temperature differences or drops have dimensions of Celsius degrees, and the thermal resistances have dimensions of Celsius degrees times square meters per watt. All absorptivities $a_1$, $a_2$, $a_w$, and $a_b$ are assumed to be knowns. The radiations $S_1$ and $S_2$ and heat flows (except for $Q_w$ and $Q_b$ measured by the sensors) are unknowns. All temperatures, except for temperatures $T_2, T_1, T_w$, and $T_b$ are unknowns. The window thermal resistance $R_g$ is taken as a known function of window temperature drop $\Delta T_g$, or as a known constant, or as unknown depending upon the mathematical model used. The thermal resistances of the regions on each side of the window $R_1$ and $R_2$ are unknowns. Each heat flux sensor is respectively assumed to be painted to have absorptivities of front and back be equal, although a more complex analysis suitably accounts for different front and back absorptivities.

The uninstrumented part of window 500 is modelled by equivalent circuit 510. Shortwave radiations $S_1$ and $S_2$ pass in opposite directions and a heat flux, such as a thermal loss, Q flows by convection, longwave radiation and conduction processes from the region having temperature $T_1$, such as the inside of a building, to window 500. Manifestly, the net heat transfer NET from the $T_2$ region to the $T_1$ region is given by:

$$NET = S_1 - S_2 - Q \qquad (1)$$

In order to permit the determination of the unknown components of the mathematical model, the window 500 is instrumented with at least white and black heat flux sensors and associated thermocouples. Because the absorption of radiation $S_1$ and $S_2$ by the white and black heat flux sensors warms them differently, they not only cause their thermal circuits 511 and 512 to have different temperatures $T_w$ and $T_b$ and different sensed heat fluxes $Q_w$ and $Q_b$ but also these temperatures and heat fluxes are not the same as the inside glazing temperature and heat flux Q of the uninstrumented window section 510. Thus, the sensors of the invention do not "measure" window circuit 510 in one sense of the word; instead they create two distinct circuits 511 and 512 providing information by which the operation of window circuit 510 can be sorted out and deduced therefrom, mathematically.

Window Model Assuming Resistance $R_g$ Known

If the window resistance is known, only the sensor assemblies on the window in circuits 511 and 512 are needed, together with the $T_2$ and $T_1$ measurements, in order to provide the computer with the data needed to permit solution for net energy transfer NET.

The following temperature-drop equation can be written from inspection of uninstrumented window circuit 510:

$$T_1 - QR_1 - (Q+S_1 a_2)R_g - (Q+S_1(a_1+a_2))R_2 = T_2 \tag{2}$$

This Equation (2) presents unknowns Q and $S_1$ found in NET Equation (1) as well as the unknown resistances $R_1$ and $R_2$. Evidently, four more equations are needed together with Equation (2) in order to solve not only for Q, $S_1$, $R_1$, and $R_2$, but also for the unknown $S_2$ in the NET Equation (1). The additional four equations are provided by inspection of the circuits 511 and 512 having the white and black sensors. For the white sensor circuit 511 the following circuit equation holds for the leftward section of circuit 511 between temperatures $T_w$ and $T_2$:

$$T_w - (Q_w + S_1(a_2+a_w))R_g - (Q_w + S_1(a_1+a_2+a_w))R_2 = T_2 \tag{3}$$

Also in white sensor circuit 511 the following circuit equation holds for the rightward section of circuit 511 between temperatures $T_w$ and $T_1$:

$$T_w + Q_w R_s + (Q_w - S_2 a_w)R_1 = T_1 \tag{4}$$

For the black sensor circuit 512 the following circuit equation holds for the leftward section of circuit 512 between temperatures $T_b$ and $T_2$:

$$T_b - (Q_b + S_1(a_2+a_b))R_g - (Q_b + S_1(a_1+a_2+a_b))R_2 = T_2 \tag{5}$$

Also in black sensor circuit 512 the following circuit equation holds for the rightward section of circuit 512 between temperatures $T_b$ and $T_1$:

$$T_b + Q_b R_s + (Q_b - S_2 a_b)R_1 = T_1 \tag{6}$$

Omitting many tedious but straightforward manipulations, the unknowns $S_1$, $S_2$, and Q of the net heat transfer NET Equation (1) are derived from the five equations (2), (3),(4),(5), and (6) with results as follows:

Solving Equation (6) for $R_1$ and substituting into Equation (4) and solving for $S_2$ yields the leftgoing radiative loss $$S_2 = \frac{kQ_b - Q_w}{ka_b - a_w} \tag{7A}$$

where $$k = \frac{(T_1 - T_w) - Q_w R_s}{(T_1 - T_b) - Q_b R_s} \tag{7B}$$

Solving Equation (5) for $R_2$ and substituting into Equation (3) and solving for $S_1$ yields the following quadratic equation in the rightgoing solar radiation $$AS_1^2 + BS_1 + C = 0 \tag{8A}$$

where $$A = a_1(a_b - a_w)R_g \tag{8B}$$

$$B = a_1 R_g(Q_b - Q_w) + (T_w - T_2)(a_1 + a_2 + a_b) - (T_b - T_2)(a_1 + a_2 + a_w) \tag{8C}$$

$$C = Q_b(T_w - T_2) - Q_w(T_b - T_2). \tag{8D}$$

Because the solar radiation cannot be negative by definition, quadratic equation (8A) is solved by the quadratic formula with the nonnegative root selected, wherein the quadratic formula is:

$$S_1 = -B/2A \pm 1/2A \sqrt{B^2 - 4AC} \tag{8E}$$

Solving Equation (2) for heat loss Q yields $$Q = \frac{(T_1 - T_2) - S_1[(a_1 + a_2)(R_2 + R_g) - a_1 R_g]}{R_1 + (R_2 + R_g)} \tag{9}$$

where (from Equation (5))

$$(R_2 + R_g) = \frac{(T_b - T_2) + S_1 a_1 R_g}{Q_b + S_1(a_1 + a_2 + a_b)} \tag{10}$$

and where (substituting $S_2$ Equations (7A) and (7B) into Equation (6))

$$R_1 = \frac{\frac{a_b}{a_w}[(T_1 - T_w) - Q_w R_s] - [(T_1 - T_b) - Q_b R_s]}{\frac{a_b}{a_w}Q_w - Q_b} \tag{11}$$

What has been done so far is to obtain formulas for the solar radiation $S_1$, the radiative loss $S_2$, and the thermal convective, longwave radiative and conductive loss Q in terms of knowns. The net energy transfer is computed by subtracting the losses $S_2$ and Q from the solar radiation $S_1$, according to Equation (1). These formulas, together with the knowns, are readily programmed into computer 34 so that the net energy transfer is continually computed and provided as an output from the computer.

Computer System and Programming

A computer system is suitably provided in the practice of the invention wherein analog-to-digital converters provide digital representations of the analog quantities presented by the heat flux sensors and thermocouples, or other temperature sensors, of the instrumented window or windows. The digital representations are stored in a memory of the computer system. The central processing unit of the system (CPU) performs the programmed instructions for computing net energy transfer, with the output being provided in serial digital form or in analog form for interfacing to a printer, CRT, or other recording device. Where one or more windows will be operated as in FIG. 2 with movable insulation, the output is provided to the appropriate window controller 172 and 182. A keyboard 35 is provided for occasional system control and initial system startup.

An example of suitable commercially available hardware and system software/compiler is the MACSYM 2 system of Analog Devices, Inc., Instruments and Systems Division, Norwood, Mass. In addition to the CPU and memory, the system includes analog-to-digital input hardware cards (ADIO Cards) and Asynchronous Communications Cards for interfacing the computer output with terminals, printers, plotters, and intelligent instruments. A form of the well-known BASIC computer language is available in the MACSYM 2. A Perkin-Elmer Model 550 CRT and keyboard terminal is suitably used, the unit being available from the Perkin-Elmer Terminals Division, Randolph, N.J.

The calculations in a suitable form of software for use in the practice of the invention are to be repeated over and over long periods of time as the temperatures and heat fluxes to be measured slowly change in response to meteorological and other factors. Accordingly, the computer burden is relatively low, permitting the practice of the invention with inexpensive minicomputers and microprocessors. The software dedicated to the invention is also suitably stored with unrelated programs and its execution time-shared with the other programs, thereby spreading the cost of the computing to other uses as well.

Figure 9:
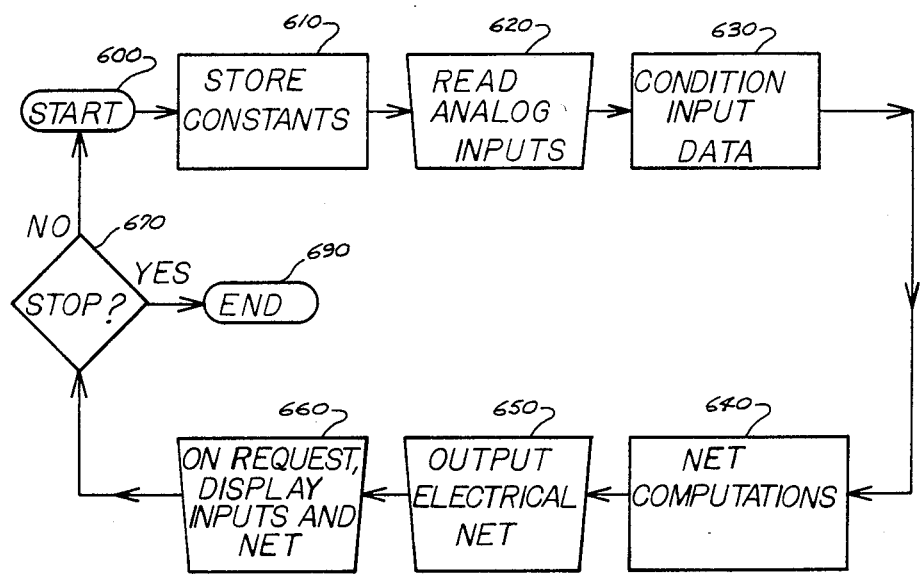
FIG. 9 is a flowchart of a computer program for use in the computer or microprocessor of the embodiments shown in FIGS. 1 and 2.

FIG. 9 shows a flowchart of the programming suitable for the practice of the invention. The program starts at point 600 and proceeds to store known constants at point 610. For example, in the instrumentation the absorptivities were $a_1 = a_2 = 0.05$; $a_b = 0.6$; $a_w = 0.3$; and flux sensor resistance $R_s = 0.04$ and window resistance $R_g = 0.111$.

At step 620 the analog inputs from the heat flux sensors and thermocouples are read by the computer and stored in memory. Because the thermocouples are differentially connected to the computer, respective temperature differences are being provided in analog form. Where resistance thermometers or other types of temperature sensors are used, the analog input alternatively corresponds to temperature itself.

At step 630 the analog input data previously read is conditioned to make it ready for use in succeeding calculations. For instance, the actual quantities for heat flux sensor output for the instrumentation were multiplied by calibration factors of $-3510$ and $-3600$ watts per meter$^2$ per volt, for the white and black heat flux sensors respectively. The differential thermocouple outputs as read by the computer were multiplied by 25,000 Celsius degrees per volt to obtain temperature differences. No further conditioning is employed for adequate operation of the invention. However, it is contemplated in further refinement of the practice of the invention that additional conditioning is provided for filtering out measurement errors (noise) and adjusting for transients when the system model is of steady-state type as in FIG. 8. Such additional conditioning utilizes data from previous measurements from the sensors and thermocouples in any suitable conditioning algorithm selected by the skilled worker.

In another aspect of conditioning the inputs, it is to be understood that the analog-to-digital converters provide outputs corresponding to the manner of hardwiring the instrumentation to them. For instance, the black heat flux sensor wire pair connected to the A/D converter can produce an output proportional to $+Q_b$, but when the wire pair is oppositely connected to the converter, the converter produces an output proportional to $-Q_b$. This sign error can be corrected, of course, merely by multiplying by $-1$ in the signal conditioning step. The same consideration applies to the differentially connected thermocouples, with a further complication. Where there are four temperatures $T_2$, $T_1$, $T_b$, and $T_w$, wire pairs can be selected for the temperature differences $T_1-T_2$; $T_1-T_b$; $T_1-T_w$; $T_2-T_b$; $T_2-T_w$; and $T_b-T_w$ (and their negatives). Fortunately, only three of the six foregoing quantities are needed as inputs to permit computation of any of the rest at the conditioning step 630. For example, if $(T_b-T_2)$ is needed, but only $(T_1-T_2)$ and $(T_1-T_b)$ are available, it suffices to perform the subtraction $(T_1-T_2)-(T_1-T_b)$ in the conditioning.

At step 640 the net energy transfer NET and other system unknowns are calculated according to the mathematical model utilized. An approximate technique was employed for calculating the solar radiation $S_1$ and the following programming was used to implement the step 640 mathematics:

| Line | Instruction |
|---|---|
| 240 | H2=(Q1/(A2+A4)−Q2/(A2+A3))/((T1−Q1/U1)/(A2+A4)−(T2−Q2/U1)/(A2+A3)) |
| 260 | T5=T2/(H2/U1+1) |
| 270 | S0=(H2*T5−Q2)/(A2+A3) |
| 280 | Q3=S0*A1 |
| 290 | H0=(Q1/(A1+A2+A4)−Q2/(A1+A2+A3)) |
| 300 | H0=H0/((T1+(Q3−Q1)/U1)/(A1+A2+A4)−(T2+(Q3−Q2)/U1)/(A1+A2+A3)) |
| 310 | T6=(U1*(T2−T5)+Q3)/H0 |
| 320 | S1=(H0*T6−Q2)/(A1+A2+A3) |
| 330 | H1=(Q1*A3/A4−Q2)/((T3−Q1/U2)*A3/A4−(T4−Q2/U2)) |
| 340 | S2=(Q2−H1*(T4−Q2/U2))/A3 |
| 350 | IF S2<0 THEN S2=0 |
| 360 | T7=(S1*(A1+A2+A4)+Q1)/H0 |
| 370 | Q4=H0*T7−S1*(A1+A2) |
| 380 | Q5=S1−S2−Q4 |

In terms of the previously-defined mathematicial model quantities, Q1 is $Q_w$; Q2 is $Q_b$; T1 is $T_w-T_2$; T2 is $T_b-T_2$; T3 is $T_1-T_w$; T4 is $T_1-T_b$; A1 is $a_1$; A2 is $a_2$; A3 is $a_b$; A4 is $a_w$; U1 is $1/R_g$; U2 is $1/R_s$; and Q5 is net heat transfer NET.

Calculations for a single-glazed window proceed the same way, except that $a_1=0$ and the thermal resistance $R_g$ is that of the window glass.

At step 650 the computer is instructed to provide an electrical output signal corresponding to NET in those cases where a window controller is employed or for a recording device.

Where more than one window is under automatic control as in FIG. 2, the computer is programmed to execute step 640 for the input data and constants corresponding to each window respectively, compute NET-101 for the first window, NET-102 for the second window, and net heat transfer for each window under automatic control, and then in step 650 direct the electrical signals corresponding to each window NET to the window controllers respectively.

In step 660, upon request from the terminal keyboard the computer displays the input data and computed value of NET on the terminal CRT screen.

In step 670, program execution is returned to starting point 600 to begin the program over again for a new set of input data unless a keyboard request or system interrupt causes execution of the program to end at END 690.

The program is executed at regular intervals, such as every 30 seconds, and the NET results for each window are stored in memory for at least 15 minutes resulting in 30 NET values. The arithmetic mean of the 30 values is suitably calculated and output as NET-101 and NET-102, providing an advantageous averaging at step 650 and smoother operation of the window insulation control units.

In all cases it is to be understood that the hereinabove-described preferred embodiments, arrangements, apparatus, methods, and systems are merely illustrative of a small number of the many possible specific embodiments and methods which can represent applications of the principles of the invention. Numerous and varied other arrangements, embodiments, apparatus, methods, and systems can readily be devised in accordance with these principles by those skilled in the art without departing from the spirit and scope of the invention and so that the utility of the invention can be fully realized.

I claim:

1. A system for measuring net energy transfer of radiation, convection and conduction through a fenestration, said fenestration having first and second surfaces and separating first and second regions, wherein the system comprises heat flux sensor means for location in thermal contact with and covering part of the first surface of said fenestration and leaving a second part of the first surface uncovered, said heat flux sensor means comprising first and second heat flux sensor elements;

temperature measuring means comprising a first temperature measuring element located in thermal contact with said first heat flux sensor element, a second temperature measuring element located in thermal contact with said second heat flux sensor element, and a third temperature measuring element for location in substantial thermal equilibrium with the first region, said first and second heat flux sensor elements in the presence of said radiation intercepting said radiation to cause measurably different heat fluxes to be sensed by said first and second heat flux sensor elements and to cause measurably different temperatures to be presented to said first and second temperature measuring elements; and computation means having said heat flux sensor means and said temperature measuring means connected to said computation means to provide temperature difference and heat flux data to said computation means, said computation means utilizing said data from every said heat flux sensor element and every said temperature measuring element together with a temperature difference between said first and second regions stored in said computation means to calculate said net energy transfer through said second part of said first surface of said fenestration, said computation means making available a measurement so calculated of said net energy transfer as a physical representation thereof.

2. The system for measuring net energy transfer claimed in claim 1 wherein each of said first, second, and third temperature measuring elements are thermocouples which are differentially connected to said computation means.

3. The system for measuring net energy transfer claimed in claim 2 wherein said temperature measuring means further comprises a fourth thermocouple for location in substantial thermal equilibrium with the second region, and which is differentially connected to said first, second and third temperature measuring elements and to said computation means thereby to permit said computation means to calculate and store said temperature difference between said first and second regions.

4. The system for measuring net energy transfer claimed in claim 1 wherein said system further comprises means for receiving said physical representation of each said measurement from said computation means and producing a record thereof.

5. The system for measuring net energy transfer claimed in claim 1 wherein said system further comprises means for receiving said physical representation of each said measurement from said computation means and providing a first indication when said net energy transfer exceeds a predetermined level and providing a second indication otherwise.

6. The system for measuring net energy transfer claimed in claim 1 wherein said system further comprises means for holding said first and second heat flux sensor elements in substantially fixed relative positions.

7. The system for measuring net energy transfer claimed in claim 1 wherein said heat flux sensor means is connected to said computation means by a plurality of lead wires, and said temperature measuring means is connected to said computation means in part by some of said plurality of lead wires, whereby the amount of lead wire required in said system is kept low.

8. A system for maintaining an inside temperature of part of a building having a window having an inside surface, wherein the system comprises heat flux sensor means located in thermal contact with the inside surface of said window, said heat flux sensor means comprising first and second heat flux sensor elements having different absorptivities to light in substantial thermal isolation from each other;

temperature measuring means comprising a first thermocouple located in thermal contact with said first heat flux sensor element, a second thermocouple located in thermal contact with said second heat flux sensor element, a third thermocouple exposed to said inside temperature, and a fourth thermocouple exposed to a temperature outside said building;

means for controllably blocking and unblocking said window;

thermostat means for designating a limit temperature and determining whether said inside temperature is higher or lower than said limit temperature; and computation and control means having said first and second heat flux sensor elements connected thereto, having said first, second, third, and fourth thermocouples differentially connected thereto, and having said thermostat means connected thereto, said computation and control means utilizing data from every one of said heat flux sensor elements and thermocouples to compute direction of net energy flow through said window and control said blocking means so that blocking occurs when said direction of net energy flow is inward and said inside temperature is higher than said limit temperature and when said direction of net energy flow is outward and said inside temperature is lower than said limit temperature.

9. The system for maintaining an inside temperature as claimed in claim 8 wherein said means for controllably blocking and unblocking comprises motor means and movable insulating means, said computation and control means controlling said motor means, said motor means moving said movable insulating means relative to said window for blocking and unblocking thereof, and wherein said first and second heat flux sensor elements and said movable insulating means are located so that said first and second heat flux sensor elements are exposed to radiation from outside of said building when said blocking means is blocking said window.

10. The system for maintaining temperature as claimed in claim 8 wherein said blocking means is controlled so that unblocking occurs when said direction of net energy flow is inward and said inside temperature is lower than said limit temperature and when said direction of net energy flow is outward and said inside temperature is higher than said limit temperature.

11. The system for maintaining temperature as claimed in claim 8 wherein said thermostat means comprises means for also designating a second limit temperature and for additionally determining whether said inside temperature is higher or lower than said second limit temperature, and said system further comprises means connected to said computation and control means for selecting any one of a plurality of control modes when said inside temperature lies between said limit temperature and said second limit temperature.

12. The system for maintaining an inside temperature as claimed in claim 8 wherein said computation and control means comprises electronic computing means having connected thereto said first and second heat flux sensor elements and having said first, second, third, and fourth thermocouples differentially connected thereto; and control means connected to said electronic computing means and to said thermostat means, said electronic computing means computing direction of net energy flow and transmitting a physical representation of said direction of net energy flow to said control means, said control means controlling said blocking means so that said blocking occurs when said direction of net energy flow is inward and said inside temperature is higher than said limit temperature and when said direction of net energy flow is outward and said inside temperature is lower than said limit temperature.

13. Apparatus for reducing temperature variations from a nominal value of inside temperature in a building having a solar energy admitting fenestration having motorized means for moving insulation from a first position to a second position for blocking and unblocking said fenestration, said apparatus comprising transducer means mountable to said fenestration for intercepting solar energy to warm part of said fenestration and for transducing two thermal quantities of said warmed part of said fenestration to electrical form;

electronic computation means having inputs connected to said transducer means, said electronic computation means comprising means for generating a physical representation of net energy transfer through said fenestration in response to said transducer means;

means for providing a thermostat output signalling whether said inside temperature in said building is higher or not higher than said nominal temperature;

means for producing a condition signal in response to said thermostat output and said physical representation of net energy transfer, the condition signal respectively assuming one or the other of two electrical values depending on whether the following logical expression is true or false: {(SAID NET ENERGY TRANSFER IS POSITIVE AND SAID INSIDE TEMPERATURE IS HIGHER THAN SAID NOMINAL TEMPERATURE) OR (SAID NET ENERGY TRANSFER IS NOT POSITIVE AND SAID INISDE TEMPERATURE IS NOT HIGHER THAN SAID NOMINAL TEMPERATURE)}; and means connected to the condition signal producing means for causing said motorized means to move said insulation to said first position in response to the one electrical value assumed by the condition signal when the logical expression is true and to move said insulation to said second position in response to the other electrical value assumed by the condition signal when the logical expression is false.

14. The apparatus for reducing temperature variations claimed in claim 13 wherein said means for providing a thermostat output comprises two sets of electrical contacts for establishing first and second nominal values of said inside temperature and further comprises switch means for selecting one of the sets of contacts and also providing a signal indicating which set of contacts is selected;

said means for producing said condition signal comprising first exclusive-OR gate means having two inputs respectively receiving said physical representation of net energy transfer and said indicating signal and further comprising second exclusive-OR gate means having two inputs respectively receiving the output of said first exclusive-OR gate means and receiving said thermostat output signalling whether said inside temperature in said building is higher than or not higher than the one of the nominal values of said inside temperature corresponding to the set of contacts which is selected, the output of said second exclusive-OR gate means comprising said condition signal.

15. The apparatus for reducing temperature variations claimed in claim 13 wherein said condition signal corresponds to a logic variable CS, and said apparatus further comprises means for selecting manual open (MO), manual close (MC), and automatic ($\overline{MO \cdot MC}$) modes for controlling said insulation;

said means for causing said motorized means to move including first sensing switch means for sensing when said insulation is in said second position (SC), first relay means, and first electronic digital logic means for driving said first relay means according to a logic function $MC \cdot \overline{SC} + \overline{MO \cdot MC} \cdot \overline{SC} \cdot CS$, said first relay means providing a first output to said motorized means and second sensing switch means for sensing when said insulation is in said first position (SO), second relay means, and second electronic digital logic means for driving said second relay means according to a logic function $MO \cdot \overline{SO} + \overline{MO \cdot MC} \cdot \overline{SO} \cdot \overline{CS}$, said second relay means providing a second output to said motorized means.

16. A method for instrumenting fenestrations for measuring net energy transfer therethrough, each said fenestration having first and second surfaces separating regions having ambient temperatures $T_1$ and $T_2$ respectively, said ambient temperatures $T_1$ and $T_2$ having auxiliary measurements made of them, wherein the method comprises providing and locating a thermocouple in the region having ambient temperature $T_1$;

providing a plurality of additional thermocouples and heat flux sensors corresponding to each said fenestration, each said plurality comprising first and second thermocouples differentially connected with said $T_1$ thermocouple for providing three temperature difference outputs, and each said plurality further comprising first and second heat flux sensors providing respective heat flux sensor electrical outputs and having different absorptivities to light;

mounting as a combination said first thermocouple of each said plurality in thermal contact with said first heat flux sensor of each said plurality respectively on said first surface of each said corresponding fenestration;

mounting as a combination said second thermocouple of each said plurality in thermal contact with said second heat flux sensor of each said plurality respectively on said first surface of each said corresponding fenestration;

analog-to-digitally converting said respective heat flux sensor electrical outputs and two of the three temperature difference outputs for each said plurality to digital representations;

electronically storing said auxiliary measurements of temperatures $T_1$ and $T_2$; and electronically computing and providing physical representations of net energy transfer respectively corresponding to said fenestrations utilizing all of said digital representations and said stored auxiliary measurements.

\* \* \* \* \*